US007953842B2

(12) United States Patent
Dillon et al.

(10) Patent No.: US 7,953,842 B2
(45) Date of Patent: May 31, 2011

(54) OPEN NETWORK-BASED DATA ACQUISITION, AGGREGATION AND OPTIMIZATION FOR USE WITH PROCESS CONTROL SYSTEMS

(75) Inventors: Steven Dillon, White Bear Lake, MN (US); Greg Rome, Woodbury, MN (US); Evren Eryurek, Minneapolis, MN (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 1049 days.

(21) Appl. No.: 10/368,816

(22) Filed: Feb. 19, 2003

(65) Prior Publication Data
US 2004/0162887 A1      Aug. 19, 2004

(51) Int. Cl.
*G06F 15/16* (2006.01)
(52) U.S. Cl. .......................... 709/224; 709/226
(58) Field of Classification Search .............. 709/207, 709/227, 217, 204, 205, 219, 223, 229; 707/100, 707/104.1, 1
See application file for complete search history.

(56) References Cited

U.S. PATENT DOCUMENTS

| | | | |
|---|---|---|---|
| 4,527,271 A | 7/1985 | Hallee et al. | |
| 4,607,325 A | 8/1986 | Horn | |
| 4,657,179 A | 4/1987 | Aggers et al. | |
| 4,734,873 A | 3/1988 | Malloy et al. | |
| 4,763,243 A | 8/1988 | Barlow et al. | |
| 4,764,862 A | 8/1988 | Barlow et al. | |
| 4,885,694 A | 12/1989 | Pray et al. | |
| 4,907,167 A | 3/1990 | Skeirik | |
| 4,910,691 A | 3/1990 | Skeirik | |
| 4,944,035 A | 7/1990 | Aagardl et al. | |
| 4,956,793 A | 9/1990 | Bonne et al. | |
| 4,965,742 A | 10/1990 | Skeirik | |
| 5,006,992 A | 4/1991 | Skeirik | |
| 5,008,810 A | 4/1991 | Kessel et al. | |
| 5,015,934 A | 5/1991 | Holley et al. | |

(Continued)

FOREIGN PATENT DOCUMENTS
CN      1227689 A      9/1999
(Continued)

OTHER PUBLICATIONS

"Should You Choose the DeltaV System" Downloaded from http://web.archive.org/web/20011212162439/http://www.easydeltav.com/aboutdeltav/index.asp. First posted on Dec. 12, 2001.*

(Continued)

*Primary Examiner* — William C Vaughn, Jr.
*Assistant Examiner* — Scott Christensen
(74) *Attorney, Agent, or Firm* — Marshall, Gerstein & Borun LLP (57) ABSTRACT

A system and method of collecting one of process control data and asset data from a plurality of data sources communicatively coupled to an open network stores location information associated with the plurality of data sources and periodically sends requests for process control information to each of the plurality of data sources by using the location information to communicate with each of the plurality of data sources via the open network. In addition, the system and method collects the process control data from messages received in response to the requests for process control information, aggregates the process control data to form aggregated process control data, and stores the aggregated process control data within a database. Additionally, the aggregated data is used in making decisions with regards to operation and maintenance of a process control system or a plant.

37 Claims, 4 Drawing Sheets

U.S. PATENT DOCUMENTS

| | | | |
|---|---|---|---|
| 5,018,215 A | 5/1991 | Nasr et al. | |
| 5,043,863 A | 8/1991 | Bristol et al. | |
| 5,050,095 A | 9/1991 | Samad | |
| 5,070,458 A | 12/1991 | Gilmore et al. | |
| 5,121,467 A | 6/1992 | Skeirik | |
| 5,134,574 A | 7/1992 | Beaverstock et al. | |
| 5,140,530 A | 8/1992 | Guha et al. | |
| 5,142,612 A | 8/1992 | Skeirik | |
| 5,161,013 A | 11/1992 | Rylander et al. | |
| 5,167,009 A | 11/1992 | Skeirik | |
| 5,187,674 A | 2/1993 | Bonne | |
| 5,193,143 A | 3/1993 | Kaemmerer et al. | |
| 5,197,114 A | 3/1993 | Skeirik | |
| 5,212,765 A | 5/1993 | Skeirik | |
| 5,224,203 A | 6/1993 | Skeirik | |
| 5,282,261 A | 1/1994 | Skeirik | |
| 5,291,190 A | 3/1994 | Scarola et al. | |
| 5,301,101 A | 4/1994 | MacArthur et al. | |
| 5,311,447 A | 5/1994 | Bonne | |
| 5,333,298 A | 7/1994 | Bland et al. | |
| 5,351,184 A | 9/1994 | Lu et al. | |
| 5,353,207 A | 10/1994 | Keeler et al. | |
| 5,369,599 A | 11/1994 | Sadjadi et al. | |
| 5,373,452 A | 12/1994 | Guha | |
| 5,384,698 A | 1/1995 | Jelinek | |
| 5,390,326 A | 2/1995 | Shah | |
| 5,396,415 A | 3/1995 | Konar et al. | |
| 5,398,303 A | 3/1995 | Tanaka | |
| 5,408,406 A | 4/1995 | Mathur et al. | |
| 5,442,544 A | 8/1995 | Jelinek | |
| 5,486,920 A | 1/1996 | Killpatrick et al. | |
| 5,486,996 A | 1/1996 | Samad et al. | |
| 5,488,697 A | 1/1996 | Kaemmerer et al. | |
| 5,537,310 A | 7/1996 | Tanake et al. | |
| 5,541,833 A | 7/1996 | Bristol et al. | |
| 5,546,301 A | 8/1996 | Agrawal et al. | |
| 5,559,690 A | 9/1996 | Keeler et al. | |
| 5,561,599 A | 10/1996 | Lu | |
| 5,566,065 A | 10/1996 | Hansen et al. | |
| 5,570,282 A | 10/1996 | Hansen et al. | |
| 5,572,420 A | 11/1996 | Lu | |
| 5,574,638 A | 11/1996 | Lu | |
| 5,596,704 A | 1/1997 | Geddes et al. | |
| 5,640,491 A | 6/1997 | Bhat et al. | |
| 5,666,297 A | 9/1997 | Britt et al. | |
| 5,687,090 A | 11/1997 | Chen et al. | |
| 5,692,158 A | 11/1997 | Degeneff et al. | |
| 5,704,011 A | 12/1997 | Hansen et al. | |
| 5,715,158 A | 2/1998 | Chen | |
| 5,715,393 A * | 2/1998 | Naugle | 709/224 |
| 5,729,661 A | 3/1998 | Keeler et al. | |
| 5,740,324 A | 4/1998 | Mathur et al. | |
| 5,742,513 A | 4/1998 | Bouhenguel et al. | |
| 5,761,518 A | 6/1998 | Boehling et al. | |
| 5,777,872 A | 7/1998 | He | |
| 5,781,432 A | 7/1998 | Keeler et al. | |
| 5,790,898 A | 8/1998 | Kishima et al. | |
| 5,796,609 A | 8/1998 | Tao et al. | |
| 5,798,939 A | 8/1998 | Ochoa et al. | |
| 5,809,490 A | 9/1998 | Guiver et al. | |
| 5,819,050 A | 10/1998 | Boehling et al. | |
| 5,819,232 A | 10/1998 | Shipman | |
| 5,825,645 A | 10/1998 | Konar et al. | |
| 5,826,249 A | 10/1998 | Skeirik | |
| 5,842,189 A | 11/1998 | Keeler et al. | |
| 5,847,952 A | 12/1998 | Samad | |
| 5,859,773 A | 1/1999 | Keeler et al. | |
| 5,877,954 A | 3/1999 | Klimasauskas et al. | |
| 5,892,679 A | 4/1999 | He | |
| 5,892,939 A | 4/1999 | Call et al. | |
| 5,898,869 A | 4/1999 | Anderson | |
| 5,901,058 A | 5/1999 | Steinman et al. | |
| 5,905,989 A | 5/1999 | Biggs | |
| 5,907,701 A | 5/1999 | Hanson | |
| 5,909,370 A | 6/1999 | Lynch | |
| 5,909,541 A | 6/1999 | Sampson et al. | |
| 5,909,586 A | 6/1999 | Anderson | |
| 5,909,671 A | 6/1999 | Byford et al. | |
| 5,917,840 A | 6/1999 | Cheney et al. | |
| 5,918,233 A | 6/1999 | La Chance et al. | |
| 5,924,086 A | 7/1999 | Mathur et al. | |
| 5,940,290 A | 8/1999 | Dixon | |
| 5,948,101 A | 9/1999 | David et al. | |
| 5,949,417 A | 9/1999 | Calder | |
| 5,960,441 A | 9/1999 | Bland et al. | |
| 5,984,502 A | 11/1999 | Calder | |
| 5,988,847 A | 11/1999 | McLaughlin et al. | |
| 6,008,985 A | 12/1999 | Lake et al. | |
| 6,033,257 A | 3/2000 | Lake et al. | |
| 6,041,263 A | 3/2000 | Boston et al. | |
| 6,047,221 A | 4/2000 | Piche et al. | |
| 6,055,483 A | 4/2000 | Lu | |
| 6,067,505 A | 5/2000 | Bonoyer et al. | |
| 6,076,124 A | 6/2000 | Korowitz et al. | |
| 6,078,843 A | 6/2000 | Shavit | |
| 6,093,211 A | 7/2000 | Hamielec et al. | |
| 6,106,785 A | 8/2000 | Havlena et al. | |
| 6,108,616 A | 8/2000 | Borchers et al. | |
| 6,110,214 A | 8/2000 | Klimasaukas | |
| 6,122,555 A | 9/2000 | Lu | |
| 6,128,279 A | 10/2000 | O'Neil et al. | |
| 6,195,697 B1 * | 2/2001 | Bowman-Amuah | 709/224 |
| 6,308,148 B1 * | 10/2001 | Bruins et al. | 703/27 |
| 6,421,571 B1 | 7/2002 | Spriggs et al. | |
| 6,728,262 B1 * | 4/2004 | Woram | 370/466 |
| 6,970,758 B1 * | 11/2005 | Shi et al. | 700/108 |
| 2002/0006790 A1 | 1/2002 | Blumenstock et al. | 455/423 |
| 2003/0145075 A1 * | 7/2003 | Weaver et al. | 709/223 |
| 2003/0187849 A1 * | 10/2003 | Ruby et al. | 707/10 |
| 2003/0195934 A1 * | 10/2003 | Peterson et al. | 709/206 |

FOREIGN PATENT DOCUMENTS

| | | |
|---|---|---|
| DE | 198 48 618 A1 | 6/2000 |
| EP | 1 182 591 A2 | 2/2002 |
| WO | WO 02/17150 A1 | 2/2002 |
| WO | WO 02/31608 A2 | 4/2002 |

OTHER PUBLICATIONS

"Our History" Downloaded from http://web.archive.org/web/20011201085324/www.easydeltav.com/aboutdeltav/ourhistory.asp. First posted on Dec. 1, 2001.* e-Security. "Partner Sales Guide" winter 2002.*

"GE PREDICTOR™ Services: GE PREDICTOR Services Overview," GE Industrial Systems, available at http://www.geindustrial.com/cwc/services?id=71 on Jul. 18, 2002.

"Electrical Equipment Coverage," GE Industrial Systems, available at http://www.geindustrial.com/cwc/services?id=72 on Jul. 18, 2002.

"Customer Impact," GE Industrial Systems, available at http://www.geindustrial.com/cwc/services?id=73 on Jul. 18, 2002.

"Components of GE PREDICTOR™ Services," GE Industrial Systems, available at http://www.geindustrial.com/cwc/services?id=74 on Jul. 18, 2002.

"Customer Benefits," GE Industrial Systems, available at http://www.geindustrial.com/cwc/services?id=75 on Jul. 18, 2002.

"Google's Custom WebSearch," conducted on Jun. 6, 2002.

International Search Report Issued in PCT/US2004/002555 completed on Jun. 29, 2004.

Written Opinion issued in PCT/US2004/002555 mailed Sep. 21, 2004.

State Intellectual Property Office of P.R. China; Notification of the Second Office Action; Application No. 200480004582.5; dated Jul. 11, 2008.

Partial International Search Report for PCT/US2004/002555, issued Jul. 9, 2004.

English-language translation of Chinese Office Action for Application No. 200910136318.1, dated Jul. 2, 2010.

* cited by examiner

```
<?xml version="1.0"?>
    <registration>
        <company>Performance Technologies</company>
        <password>*****</password>
        <servicename>AMS_GetDeviceList
            <server>URL</server>
            <authentication>yes</authentication>
            <serviceusername>USERName</serviceusername>
            <servicepassword>Password</servicepassword>
        </servicename>
    </registration>
```

```
<?xml version="1.0"?>
    <request>type="getservices" filter="servicename">
        <authentication>
            <company>Encrypted Text</company>
            <password>Encrypted Text</password>
        </authentication>
    </request>
```

FIG. 5

OPEN NETWORK-BASED DATA ACQUISITION, AGGREGATION AND OPTIMIZATION FOR USE WITH PROCESS CONTROL SYSTEMS

TECHNICAL FIELD

The invention relates generally to process control systems and, more particularly, the invention relates to acquiring and aggregating process control data from a plurality of data sources via an open communication network.

DESCRIPTION OF THE RELATED ART

Process control systems, like those used in chemical, petroleum or other processes, typically include one or more centralized process controllers communicatively coupled to at least one host or operator workstation and to one or more field devices via analog, digital or combined analog/digital buses. The field devices, which may be, for example valves, valve positioners, switches and transmitters (e.g., temperature, pressure and flow rate sensors), perform functions within the process such as opening or closing valves and measuring process parameters. The process controller receives signals indicative of process measurements made by the field devices and/or other information pertaining to the field devices, uses this information to implement a control routine and then generates control signals that are sent over the buses or other communication lines to the field devices to control the operation of the process. Information from the field devices and the controllers may be made available to one or more applications executed by the operator workstation to enable an operator to perform desired functions with respect to the process, such as viewing the current state of the process, modifying the operation of the process, etc.

Typically, a process control system operates within an enterprise that may include several process control plants, which may be distributed throughout a large geographic area, or in some cases, throughout the world. The process control plants may communicate with each other using a variety of communication media and technologies or platforms such as, for example, the Internet, satellite links, ground-based wireless transmissions, telephone lines, etc. Of course, the Internet has become a preferred communication platform for many enterprises because the communications infrastructure is established, making the communication infrastructure costs for an enterprise near zero, and the technologies used to communicate information via the Internet are well-understood, stable, secure, etc.

Each process control plant within an enterprise may include one or more process control systems or applications as well as a number of other business-related or information technology systems or applications, which are needed to support or maintain or which are complementary to the operation of the process control systems. In general, the information technology systems within a process control plant may include manufacturing execution systems such as, for example, a maintenance management system and may also include enterprise resource planning systems such as, for example, scheduling, accounting and procurement systems. Although these information technology systems may be physically located within or near a plant, in some cases a few or possibly all of these systems may be remotely located with respect to the plant and may communicate with the plant using the Internet or any other suitable communication link. To improve or optimize the overall operation of an enterprise some recent development efforts have been directed to facilitating more rapid and efficient communications and enabling more complete integration between process control systems and information technology systems within an enterprise.

Each process control plant may also include user-interactive applications that may be executed on a server or workstation that is communicatively coupled to one or more servers, workstations, or other computers that coordinate or perform the activities of the process control system within the plant. Such user-interactive applications may perform campaign management functions, historical data management functions, asset management functions such as, for example, asset optimization functions, batch management functions, etc. In addition, each of the process control systems within a plant may include process management applications that may, for example, manage the communications of and provide information relating to alarm and/or other process events, provide information or data relating to the condition of the process or processes performed by the process control plant, provide information or data relating to the condition or performance of equipment associated with the process control plant, etc. In particular, process management applications may include vibration monitoring applications, real-time optimization applications, expert system applications, predictive maintenance applications, control loop monitoring applications, or any other applications related to controlling, monitoring and/or maintaining a process control system or plant. Still further, a process control plant or enterprise may include one or more communication applications that may be used to communicate information from the process control system or plant to a user via a variety of different communication media and platforms. For example, these communication applications may include email applications, paging applications, voice messaging applications, file-based applications, etc., all of which may be adapted to send information via a wireless or hardwired media to a desktop computer, a laptop computer, a personal data assistant, a cellular phone or pager, or any other type of device or hardware platform.

Generally speaking, the effective integration of information technology systems, user-interactive applications, process management applications and communication applications has been extremely difficult, if not impossible, because these systems and applications are typically distributed widely throughout an enterprise and, in some cases, are widely geographically dispersed. Additionally, these systems and applications typically require the development of a custom communication interface or software driver that enables the different systems and applications to communicate with each other. As a result, when any system, application, device or component within the enterprise changes due to, for example, a firmware upgrade, device replacement, etc., the custom communication driver or interface for that system, device or component may also have to be changed. Obviously, the large number of custom drivers needed results in a lot of time-consuming driver maintenance, which results in high enterprise maintenance costs. Furthermore, adding a system or application to an enterprise or a process control plant often requires an enormous programming effort because a plurality of custom communication drivers or interfaces may have to be developed to enable the new system or application to communicate with the other systems and applications within the enterprise. Thus, systems that use such custom communication interfaces are not very flexible or scalable and do not facilitate, for example, the integration of a process control system with other systems and applications, which may be provided by the manufacturer of the process control system or which may be provided by a third party manufacturer or developer.

Another difficulty associated with known systems is the inability of these systems to enable system users or operators to configure and/or add applications, services or systems to the enterprise or process control plant. To the contrary, these known systems typically require the services of a skilled programmer to configure and/or integrate an application, service or system that has not been previously configured or integrated. For example, the programmer may have to have intimate knowledge of how the application, service or system to be configured and/or integrated operates and may have to generate a configuration routine or routines and one or more custom communication drivers or interfaces that enable that system, application or service to communicate with other systems, applications or services within the enterprise.

Some recent development efforts have focused on using extensible markup languages to facilitate communications between the different applications, systems and services that make up an enterprise. It is generally known that extensible markup languages such as, for example, XML, may be used to enable different systems, applications and/or services to be loosely coupled to each other so that each of the different systems, applications and/or services do not have to have intimate knowledge of how the other systems, applications and/or services function to communicate with them. Some recently developed systems may combine the use of XML with network communication protocols such as simple object access protocol (SOAP) and network transport protocols such as, for example, hypertext transport protocol (HTTP) to enable these loosely coupled services, applications, and/or systems to communicate via an open network such as, for example, the Internet.

Thus, modern process control systems often include a variety of systems and applications that are functionally diverse and geographically distributed. As a result, it is generally relatively difficult to obtain process control data or information from all of these systems, much less to create and manage a central repository (e.g., a database) for such enterprise-wide information upon which various types of analyses can be performed such as, for example, asset optimization routines, which may be part of an asset management system or the like.

Furthermore, generating and maintaining a database containing process control data and other information gathered from the many systems and applications that typically make up an enterprise is complicated by the fact that even if the information for storage in such a database could be gathered within a central repository, enormous amounts of unfiltered data or information would typically have to be stored. Unfortunately, such enormous amounts of data or information would be very difficult, if not impossible, to process or analyze in an efficient manner. Still further, owing to the difficulties associated with establishing and carrying out communications between a system or application, which is responsible for collecting data or information for a central repository or database, and other systems, applications, processes, etc. that are distributed throughout an enterprise, asset management systems (e.g., asset optimization systems or applications) may have difficulty obtaining all of the information needed to most efficiently manage a process within an enterprise, much less the overall operations of an enterprise.

As is well known, a software robot or "bot" is a computer program that runs automatically to carry out a mission or objective, which usually involves gathering information or data, that would otherwise have to be performed manually by a person. In fact, bots are commonly used to automatically collect information from a plurality of distributed data sources that are communicatively coupled via an open communication network such as, for example, the Internet. For example, internet search engines, which are sometimes referred to as web crawlers, typically employ a bot that moves (i.e., crawls) from one server to another (i.e., communicates with servers in sequence), compiling enormous lists of uniform resource locators (URLs) based on keywords entered by a user or based on some other criteria. On the other hand, a shopping bot may compile a database of products sold via online stores based on criteria provided by a user. In any event, bots may be used to eliminate the need for a person to manually search for information or mine data by carrying out such searching and/or mining functions automatically, rapidly and continuously. Additionally, bots may be adapted to make search decisions based on past experiences to further refine a search as it progresses.

Unfortunately, bots have not typically been used to gather process control data or other process control-related data or information from the various systems or applications that make up a process control system and the enterprise within which that process control system operates. In fact, known bots typically do not function within an environment in which information or data must be conveyed between data sources via an open network (e.g., the Internet) in a secure manner. To the contrary, bots typically do not initially have any information about available data sources. Likewise, potential data sources do not have any advance knowledge of the bot. As a result, known bots typically rely on free access to information from data sources that are discovered by the bot using a well-defined or, in some cases, an ad hoc search algorithm or technique.

Furthermore, because known bots typically do not have prior knowledge of the data sources containing information or data that is needed or of interest, using a bot to gather process control information associated with a particular enterprise and/or process control system would require an impractical amount of time. In fact, due to the difficulties in providing a bot with an infallible search algorithm or technique, known bots would likely fail to find one or more data sources associated with a process control system and/or enterprise from which information is needed.

SUMMARY

In accordance with one aspect of the invention, a system and method of collecting process control data and asset data (collectively referred to hereinafter as "process control/asset data") from a plurality of data sources communicatively coupled to an open network stores location information associated with the plurality of data sources and periodically sends requests for process control information and asset information (collectively referred to hereinafter as "process control/asset information") to each of the plurality of data sources by using the location information to communicate with each of the plurality of data sources via the open network. In addition, the system and method may collect the process control/asset data from messages received in response to the requests for process control/asset information, aggregate the process control/asset data to form aggregated process control/asset data, and store the aggregated process control/asset data within a database.

In accordance with another aspect of the invention, a system and method of retrieving data from a plurality of data sources, each of which is communicatively coupled to an open network via a respective web service interface, retrieves network address information associated with the data sources from a database and uses the network address information to send request messages to the data sources via the open network and the respective web service interfaces of the data sources. The system and method may also receive a plurality of response messages containing the data from the data sources and may extract the data from the received response messages to form extracted data. In addition, the system and method may aggregate the extracted data to form aggregated data and may store the aggregated data.

In accordance with yet another aspect of the invention, a system and method of establishing communications between a data collection system and a plurality of data sources associated with an enterprise and communicatively coupled via an internet sends registration information for each of the data sources associated with the enterprise to a registration service communicatively coupled to the internet and requests the registration information for each of the data sources by sending authorization information associated with the enterprise from the data collection system to the registration service. Additionally, the system and method may send the registration information for the data sources from the registration service to the data collection system only if the authorization information is valid and may store the registration information within the data collection system. Further, the system and method may use the registration information to enable the data collection system to establish communications with the data sources.

DESCRIPTION

The system and method described herein may be used to acquire and aggregate process control/asset data from a plurality of data sources communicatively coupled via a communication network. More specifically, the system and method described herein may automatically acquire, aggregate and filter process control/asset information or data from a plurality of systems, applications or web services constituting an enterprise, which typically includes one or more process control systems, within a central repository or storage location such as, for example, a database. In this manner, the aggregated and/or filtered process control/asset data or information may be efficiently processed or otherwise used by an asset management system or application to, for example, optimize the operation of one or more plants, systems, applications, etc. within the enterprise.

In particular, the system and method described herein may be used to acquire process control/asset data, or any other information, from a plurality of systems or applications associated with a particular enterprise or organization that are communicatively coupled to an open network. For example, in a web-based approach, each system or application associated with the enterprise may include a web service interface that enables communication with the system described herein via the Internet.

Additionally, the system and method described herein may obtain or, alternatively, may be provided with contact or location information such as, for example, a uniform resource locator URL (i.e., a network address), associated with each of the data sources (i.e., the systems, applications, web services, etc.) within the enterprise for which process control/asset information or data is to be acquired and aggregated. By way of example, the acquisition and aggregation system and method described herein may obtain a list of URLs from a local database and may use the URLs to periodically poll or query the data sources (which are preferably but not necessarily configured as a web service associated with those URLs) for process control/asset information or data pertaining to the overall enterprise of which they are a part. Alternatively, as described in greater detail below, the acquisition and aggregation system and method described herein may obtain location or network address information for data sources that are part of the overall enterprise from a secure registration service that is communicatively coupled to an open network. The secure registration service may function as a central data repository or store that enables one or more enterprises, organizations or other entities to register contact, location or network address information for the services or applications that compose the enterprises, organizations or other entities, thereby enabling authorized users to access information from those services or applications from any device communicatively coupled to the open network.

Thus, because the system and method described herein provides a local database including location network address information identifying all of the data sources (i.e., the systems, applications, etc.) that make up a particular enterprise, the possibility that one or more of these systems, applications, etc. are missed or undiscovered is eliminated, thereby eliminating the possibility that important process control/asset information will not be gathered for analysis by asset management software or any other applications. Furthermore, the predetermined data source location information stored within the local database enables the system and method described herein to rapidly begin data acquisition and aggregation activities that would be virtually impossible with prior or known bots and the like due to the relatively large amount time that is typically required to identify available data sources via an extensive open network such as, for example, the Internet. In fact, as noted above, known approaches may result in one or more data sources not being found at all.

While the data acquisition and aggregation system and method is described in detail herein by way of example as being implemented using software that is executed within a workstation to automatically perform data acquisition and aggregation functions via the Internet in a manner similar to that of a software robot or bot, any other combination of software and hardware could be used instead. For example, any suitable computer system, including one or more computers of one or more types, could be used instead of a single workstation. In addition, although the system and method described herein is web-based and, thus, uses web service interfaces to enable the data sources within an enterprise to convey process control/asset data and any other information via the Internet, any other similar or different open network and suitable network interfaces could be used instead.

Figure 1:
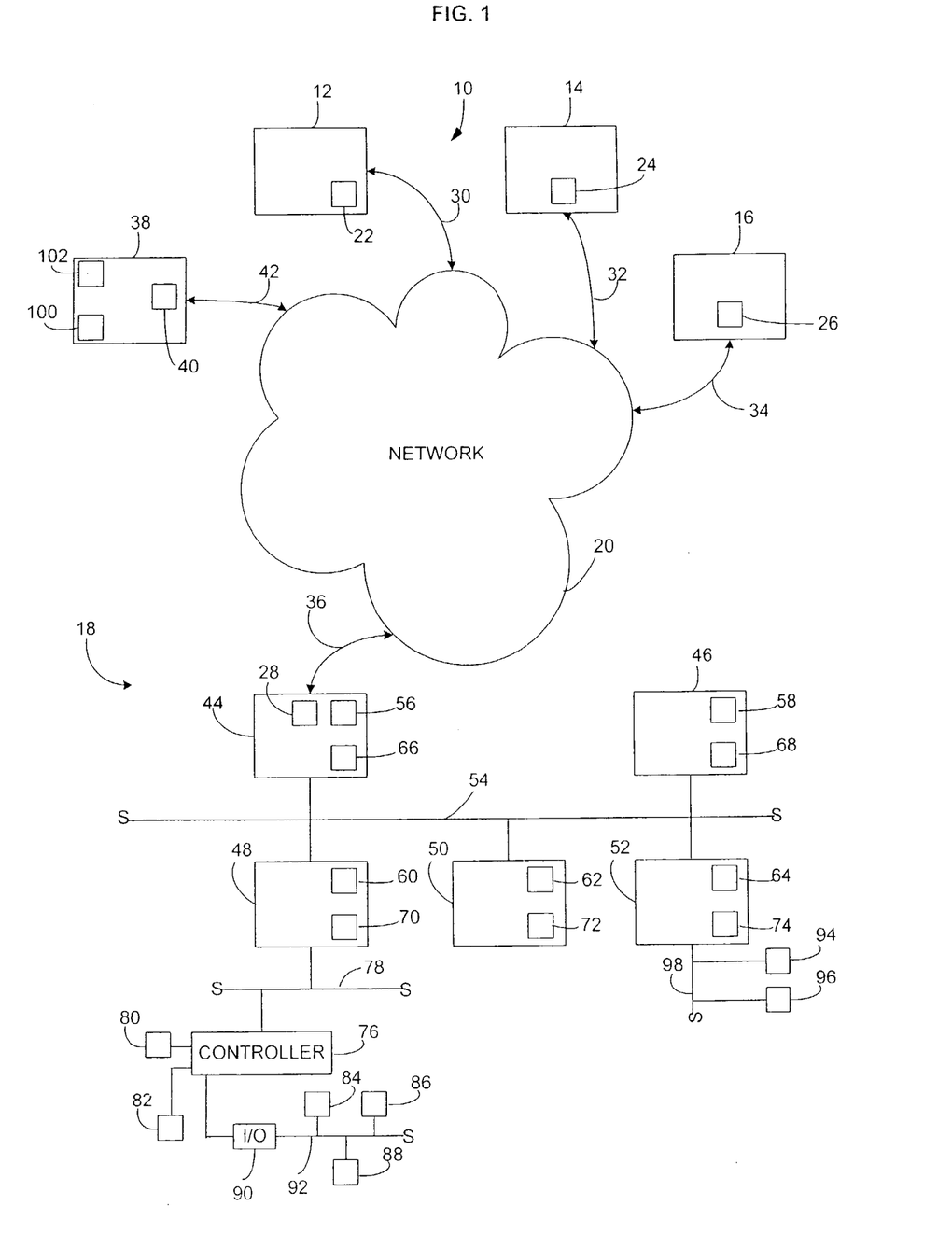
FIG. 1 is a block diagram of an example of an enterprise including a plurality of data sources that are communicatively coupled via an open communication network.

FIG. 1 is a block diagram of an example of an enterprise 10 including a plurality of data sources 12, 14, 16 and 18 that are communicatively coupled via an open communication network 20. Each of the data sources 12-18 includes a respective web service interface 22, 24, 26 and 28, which enables the data sources 12-18 to communicate with each other (and/or other data sources or services communicatively coupled to the network 20) via the network 20 using respective communication links 30, 32, 34 and 36. As described in greater detail below, the enterprise 10 may also include a data registration service 38, which includes a web service interface 40 that enables the data registration service 38 to communicate with one or more of the data sources 12-18 via the network 20 using a communication link 42.

The enterprise 10 depicted in FIG. 1 may be associated with a particular business entity or a portion or portions of a particular business entity. Alternatively, the enterprise 10 may be associated with a plurality of business entities, which may be related through, for example, a common business goal or arrangement. In any event, the data sources 12-18 (and other elements or constituents of the enterprise 10, some of which are not shown for purposes of clarity) of the enterprise 10 may be geographically distributed. For example, some of the data sources 12-18 may be located with a single physical plant or campus, while other ones of the data sources 12-18 may be remotely geographically located such as, for example, in different states or countries.

Each of the data sources 12-18 may include one or more applications, systems, services, etc. For example, the data sources 12-18 may be any desired combination of process control systems, financial or business management systems, manufacturing systems, maintenance systems, diagnostic systems, etc., all of which preferably, but which do not necessarily, include information pertaining to (or which may be useful in controlling and/or assessing) process control activities within the enterprise 10. Each of the data sources 12-18 may be implemented using a personal computer, a workstation, or any other suitable computer system or processor capable of executing one or more software routines stored in a memory or other data storage device associated therewith. In addition, each of the data sources 12-18 may perform one or more applications or functions such as, for example, communication functions, applications that carry out accounting functions, manufacturing functions, maintenance functions, optimization functions, monitoring functions, process control functions, etc. Each of the data sources 12-18 may also include an operator terminal, keyboard, display and/or any other interface devices (none of which are shown) that may enable a user to receive information from and to enter information into the data source. In addition, one or more of the data sources 12-18 may also be adapted to automatically generate messages containing asset data and/or process control data, and to communicate (also known as to push) such messages to another system located within the enterprise 10 and connected to the network 20.

By way of example only, the data source 18 is depicted as a process control system or plant. As shown in FIG. 1, the data source, process control system or plant 18 includes a plurality of workstations or computer systems 44, 46, 48, 50 and 52, all of which may be communicatively coupled via a system level network or data bus 54. The network or data bus 54 may be implemented using any desired media and data transmission protocol. For example, the data bus 54 may be implemented using an Ethernet-based configuration. However, any other suitable data bus or network media and data transmission protocol may be used instead.

The computer systems 44-52 include respective processors 56, 58, 60, 62 and 64 and memories 66, 68, 70, 72 and 74. One or more software routines may be stored within each of the memories 66-74 and may be executed by the one of the processors 56-64 associated therewith to perform one or more functions. For example, when executed, the software routines may perform asset management or optimization functions, process control functions, equipment and process monitoring functions, communication functions (e.g., paging, email, etc.), accounting functions, maintenance functions, campaign management functions, diagnostic functions, data historian functions, etc.

As shown by way of example in FIG. 1, the workstation or computer system 48 is configured to perform process control functions or activities. In particular, the computer system 48 is communicatively coupled to a controller 76 via a data bus 78. The controller 76 may be, for example, be a DeltaV™ controller commercially available from Fisher Rosemount Systems, Inc. of Austin, Tex. However, any other suitable controller could be used instead. A plurality of field devices 80, 82, 84, 86 and 88 may be communicatively coupled to the controller 76, either directly as depicted with the devices 80 and 82 or via an input/output device 90 and data bus 92 as depicted with the devices 84-88. In general, the field devices 80-88 may be sensors, actuators, or any other devices that may be used within a process control system to monitor and/or control the operations thereof. Furthermore, some of the field devices 80-88, such as the devices 80 and 82, may be non-smart field devices that communicate with the controller 76 using analog or two-state electrical signals such as, for example, 4-20 milliampere (mA), 0-10 volts direct current (VDC), dry contact outputs or inputs, etc. Still further, other ones of the field devices 80-88, such as the devices 84-88, may be smart field devices such as, for example, Fieldbus devices, HART devices, etc., all of which are well known and, thus, need not be described in greater detail herein.

The computer system 52 may be, for example, a monitoring or diagnostic system that is coupled to a plurality of devices 94 and 96 via a communication link 98, which may be, for example, a data bus or any other suitable communication link. In particular, the devices 94 and 96 may be rotating equipment such as, for example, electric generators that supply power to the various systems within the process control plant 18. Similarly, the computer 50 may be, for example, an asset management system that performs a number of asset management functions and stores information about various devices including instruments, mechanical equipments, process equipments, electrical equipments, etc., used in the process control system or plant 18. An example of an instrument used in the process control system or plant 18, for which the asset management system implemented by the computer 50 may store and maintain asset information, may be a valve, a temperature gauge, etc. Similarly, information about other equipments used in the process control system or plant 18, such as motors, pumps, gear boxes, reactors, heat exchanges, turbines, compressors, furnaces, switches, power supplies, etc., may also be maintained by the asset management system implemented by the computer 50. In an implementation of the asset management system, the computer 50 may contain various parameter values for one or more of the devices listed above, including a device type, a device tag, a device failure type, etc. The remaining computer systems 44, and 46 may perform any desired functions, including, for example, diagnostic functions, data historian functions, communication functions, etc. and may exchange information or data within the process control plant 18 via the data bus 54 and within the enterprise 10 via the web service interface 28, the communication link 36 and the network 20.

In general, the web service interfaces 22-28 enable the respective data sources 12-18, each of which may perform one or more functions within the enterprise 10 as discussed above, to communicate without having to generate custom communication interfaces. As is well known, web service interfaces are generic in nature and eliminate the requirement for underlying software applications or systems to have detailed knowledge of how the software applications they communicate with process communications and the information contained therein. Therefore, a pair of applications or systems having web service interfaces can communicate with each other relatively freely without having any specific or detailed knowledge of how the applications underlying the web service interfaces operate.

More specifically, the web service interfaces 22-28 and 40 may be implemented using an extensible markup language such as XML and, thus, may convey XML messages that have been formatted using simple object access protocol (SOAP), or any other desired message protocol, and which have been encapsulated for transmission using a network transport protocol such as, for example, hypertext transport protocol (HTTP). Web service interfaces, generation of XML messages, SOAP and HTTP are all well known and, thus, are not described in greater detail herein.

Preferably, the network 20 is an open network (i.e., an open protocol or non-proprietary network) that can be readily accessed by the data sources 12-18 via their respective web service interfaces 22, 24, 26 and 28. For example, the Internet may be advantageously used as the network 20 because the Internet is well established, well developed, ubiquitous, highly accessible, and relatively inexpensive for sending large amounts of information or data. However, despite the advantages of using the Internet to implement the network 20, any other network or combination of networks, based on an open protocol could be used instead. Additionally, the communication links 30-36 and 42 may be based on any desired media and data transmission protocol. For example, any suitable combination of wireless and/or hardwired media may be used in conjunction with a packet-switching transport protocol such as, for example, transmission control protocol (TCP).

As described in greater detail in connection with FIG. 3 below, the optional data source registration service 38 includes a processor 100 and a memory 102, which includes one or more software routines that are adapted be executed by the processor 100 to enable the data sources 12-18 to centrally store location or network address information (e.g., a URL) for each of the data sources associated with the enterprise 10. Although not shown in FIG. 1, other enterprises may also communicate via the network 20 and may use the data registration service 38 to store information pertaining to the data sources associated therewith.

Figure 2:
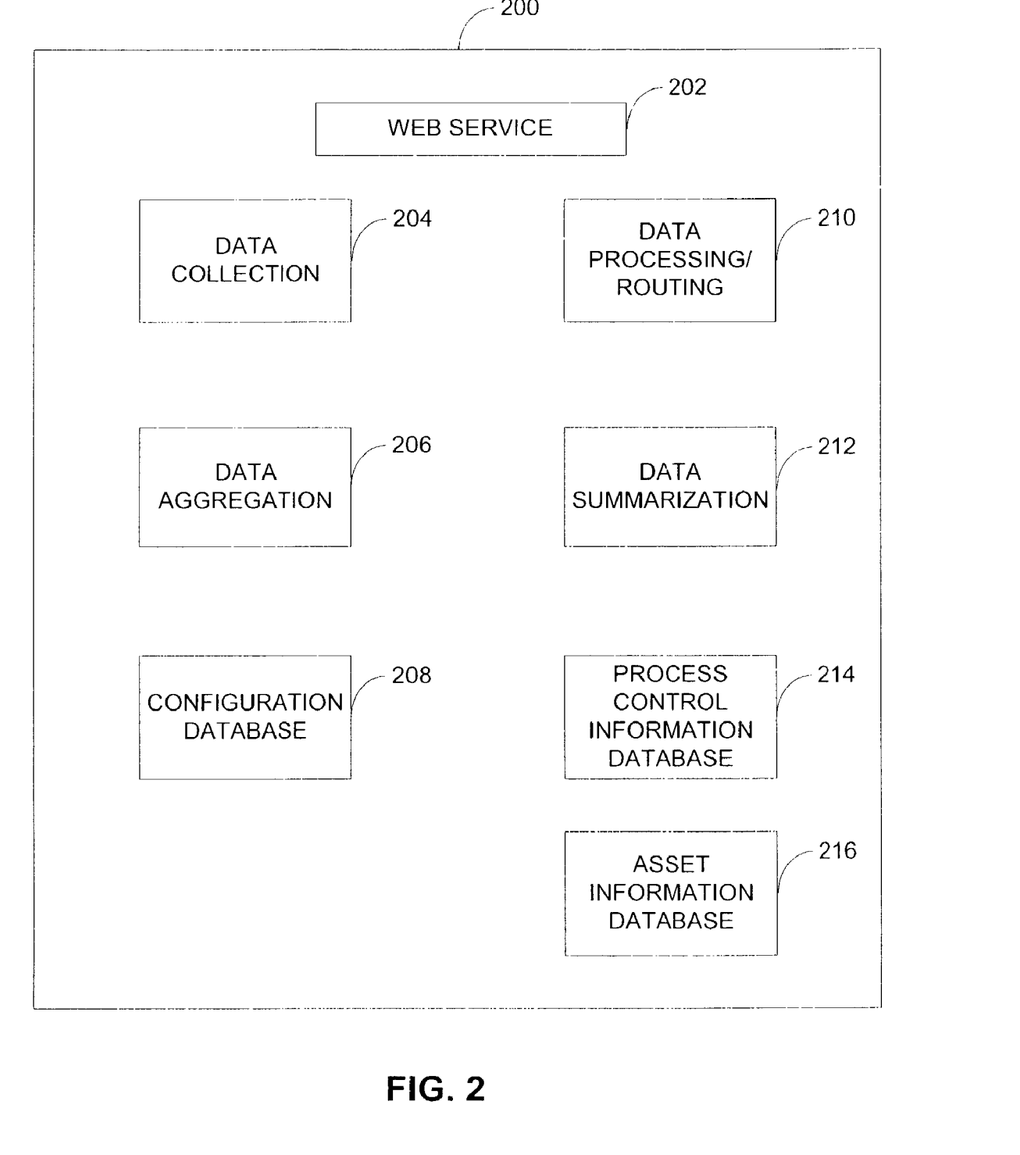
FIG. 2 is a block diagram of an example of a system that may be implemented within the enterprise shown in FIG. 1 to automatically acquire and aggregate process control/asset data from one or more of the data sources within the enterprise.

FIG. 2 is a block diagram of an example of a system 200 that may be implemented within the enterprise 10 shown in FIG. 1 to automatically acquire and aggregate process control/asset data from one or more of the data sources 12-18 within the enterprise 10. As shown in FIG. 2, the system 200 includes a web service interface 202, which enables the system 200 to freely communicate with the data sources 12-18 via the network 20 and their respective web service interfaces 22-28, a data collection unit 204, a data aggregation unit 206, a configuration database 208, a data processing/routing unit 210, a data summarization unit 212, a process control information database 214, and an asset information database 216.

Generally speaking, the system 200 periodically collects process control/asset data and/or other information from one or more of the data sources 12-18 via the network 20. In particular, the system 200 uses a list or log of location identifiers or information (e.g., URLs), which are uniquely associated with the data sources 12-18 of the enterprise 10 and are stored within the configuration database 208. These location identifiers enable the system 200 to quickly and easily find and poll the data sources 12-18 for process control/asset data or any other information. The data which is collected by the system 200 may then be aggregated, processed (e.g., filtered), summarized and stored for later analysis by an asset management system or any other system or application.

More specifically, the data collection unit 204 uses the list or log containing location information or address information associated with the data sources 12-18 to contact the data sources 12-18 to acquire information from one or more of the data sources 12-18 on a periodic basis (i.e., using a time-based schedule). For example, the data collection unit 204 may cause the system 200 to use its web service interface 202 to sequentially contact each of the data sources 12-18 via the network 20 at fixed repetitive time intervals. In other words, the system 200 may use its data collection unit 204 to periodically (e.g., at a fixed time interval or using a fixed time schedule) scan one or more of the data sources 12-18.

In another implementation of the system 200, the data collection unit 204 may cause the system 200 to monitor its web service interface 202 to receive any message from a data source identified in the configuration database 208. In this implementation if any of the data source 12-18 transmits a message containing the data with the web service interface 202 as a recipient, the collection unit 204 will collect such a message from the network 20.

When receiving data or information from the data sources 12-18, the data collection unit 204 may receive large amounts of data in the form of XML messages, for example, which may contain data or information that is not currently needed for analysis purposes. The data processing/routing unit 210 may inform the data collection unit 204 specifically what information is needed according to the current configuration of the system 200. In other words, a system user may configure the system 200 to collect the particular types of process control/asset information or data that are needed by the applications or systems that analyze the summarized, aggregated and filtered data which is ultimately stored within the process control information database 214 and the asset information database 216. As a result, the data collection unit 204 may receive XML messages that contain information or data that is not needed and/or may receive messages that do not contain any data which is needed. Thus, the data collection unit 204 may strip some messages for data or information which is needed and may discard some messages entirely if those messages do not contain any needed data or information.

The data or information collected by the data collection unit 204 may be aggregated by the data aggregation unit 206 and summarized by the data summarization unit 212. Aggregation of data that has been collected and filtered by the data collection unit 204 may involve reducing a plurality of alarm messages to a single text message. For example, the data collection unit 204 may, based on a user set configuration for the system 200, collect all critical device alarms from the data sources 12-18. Additionally, the data aggregation unit 206 may, for example, reduce a plurality of identical device alarms, each of which may have been received in connection with the same failing device during a different polling interval of the system 200, to a single text message indicating a repetitive failure of the device that resulted in generation of the repetitive alarms.

In addition to aggregating redundant or repetitive data such as, for example, repetitive devices alerts, the data aggregation unit 206 may also aggregate data (e.g., alarms or alerts) in other manners. For example, the data aggregation unit 206 may aggregate data such as, for example, device alerts, to form more generalized alerts. Generalized alerts or other generalized information or data generated by the data aggregation unit 206 may be based on historical information. For example, the data aggregation unit 206 may generate mean time between failure information for one or more devices, may generate aggregate device information associated with the ages of devices (e.g., the number of failures associated with groups of devices where each of the device groups includes devices having different ranges of ages), may generate aggregate device information associated with device types (e.g., sensor or actuator type), etc. More generally, the data aggregation unit 206 may perform data aggregation activities based on historical analysis or real-time analysis. For example, a time series analysis may be used to determine or predict when a particular device may fail or the time at which it will need service. In any case, information pertaining to predicted failures or any other aggregated data may be stored in the process control information database 214 for subsequent use within the enterprise 10.

A time series analysis may be used to compare current device conditions to conditions under which similar devices failed or required service and may store (e.g., within the process control information database 214) an aggregated alarm or alert indicating that a particular device needs service or needs to be replaced. In general, time series analyses may be used to make a comparison between current conditions within a process control system and known good or known bad conditions. A time series analysis may reveal, for example, that a particular device fails under the same conditions or at the same time each day, month, etc. and, thus, may be used to predict when device failures will occur.

In addition to historical time series analyses, real-time analyses may be used to aggregate process control/asset data or other information collected by the data collection unit 204. For example, the data collection unit 204 may collect a large amount of vibration data (e.g., a time-based snap shot of the vibration characteristics) associated with a particular piece of equipment and the data aggregation unit 206 may compare this snap shot of current vibration data to known good or known bad conditions to generate an aggregated result indicative of the condition of the device being monitored. For example, the aggregation unit 206 may generate an aggregated alert or alarm indicating that a particular device is producing an excessive vibration and may store this alert or alarm within the process control information database 214 for subsequent use by, for example, a maintenance system within the enterprise 10.

The data summarization unit 212 may be used to summarize aggregated data provided by the data aggregation unit 206 prior to storing data within the process control information database 214. For example, the data summarization unit 212 may determine that all transmitters of a particular type are failing for the same reason (e.g., under the same conditions or at the same time) and may store information within the process control information database 214 indicating that all transmitters of that particular type are failing for the same reason. The data summarization unit 212 may also generate summary information associated with the number and/or types of devices failing for particular reasons, the total number of active alerts or alarms, the number of alarms according to severity of the alarms or alerts, the amount of time elapsed since the reporting of an alarm or alarms to the time at which the source of the alarm or alert received service to correct the condition causing the alert or alarm. Still further, the data summarization unit 212 may use the aggregated data or information received from the data aggregation unit 206 to determine the total number of devices that will fail (i.e., the total number that are predicted to fail) within a certain time interval.

As discussed above, the data processing/routing unit 210 may provide information to the data collection unit 204 to cause the data collection unit 204 to strip information or data from received messages which, according to the configuration of the system 200, is needed for analysis and/or reporting purposes. In addition, the data processing/routing unit 210 may perform information routing functions. For example, the data processing/routing unit 210 may include decision logic or the like for carrying out routing decisions for various types of data that has been collected, aggregated and/or summarized. More specifically, the data processing/routing unit 210 may use decision logic (e.g., if then statements or other logical operations) to determine where and how data should be routed. For example, the data processing/routing unit 210 may, based on the type and content of data, send data via email or via a personal data assistant to a user. Still further, the data processing/routing unit 210 may route aggregated and summarized data to the process control information database 214 or to any other database and, if desired, may include priority information that may be used to control the subsequent routing, display, processing, etc. of the data.

The process control information database 214 may be any desired storage device or unit such as, for example, a mass storage device that uses any suitable computer readable storage medium, including magnetic and/or optical media. The process control information database 214 may be directly connected to the system 200 via a hardwired link, may be physically separate or remotely located from the other functional blocks 202-212 of the system 200 shown in FIG. 2 and may be connected to the functional blocks 202-212 via a network or any other communication link. Still further, the process control information database 214 may be accessible by other systems and devices not shown in FIG. 2 that may process or otherwise use the data stored therein. For example, asset management systems, asset optimization systems, maintenance systems, etc., may use the data stored within the process control information database 214 to operate the plant or enterprise 10 more efficiently (e.g., profitably).

Similarly, the asset information database 216 may be any desired storage device or unit such as, for example, a mass storage device that uses any suitable computer readable storage medium, including magnetic and/or optical media. The asset information database 216 may be directly connected to the system 200 via a hardwired link, may be physically separate or remotely located from the other functional blocks 202-212 of the system 200 shown in FIG. 2 and may be connected to the functional blocks 202-212 via a network or any other communication link. Still further, the asset information database 216 may be accessible by other systems and devices not shown in FIG. 2 that may process or may otherwise use the data stored therein. For example, asset management systems, asset optimization systems, maintenance systems, etc., may use the data stored within the asset information database 216 to operate the plant or enterprise 10 more efficiently.

The asset information database 216 may be used to store asset information related to various plants and process control systems such as, for example, process control system or plant 18. For example, the data acquisition unit 204 may collect asset information from an asset management systems such as the one maintained by the computer 50, the data aggregation unit 206 may aggregate the asset information collected from computer 50 with other asset information collected from other data sources connected with the network 20 and store aggregated information in the asset information database 216 for a future use. The asset information stored in the asset information database 216 may be used, for example, by the data processing/routing unit 210 to optimize resources among various process control systems and/or plants.

Each of the units 204-216 may be implemented using one or more software routines that are stored on a computer readable medium within a computer system and which are adapted to be executed by one or more processors within the computer system. For example, software routines may be stored and executed within any of the computer systems 44-52 of the data source 18 or, alternatively, may be stored and executed within any of the other data sources 12-16 or another dedicated computer system or workstation communicatively coupled to the network 20 (not shown). Although the units 204-216 could be implemented using primarily software routines adapted for execution by a processor or other processing unit, any suitable combination of hardware and software could be used instead to perform the required functions. Furthermore, while the units 204-216 are shown and described above as separate or distinct functional blocks, the functions performed in connection with the units 204-216 may be combined in any desired manner. For example, the functions performed by the data aggregation unit 206 and the data summarization unit 212 could be performed by a single software routine or group of software routines and, in that case, could be functionally represented as being within a single unit or block.

Figure 3:
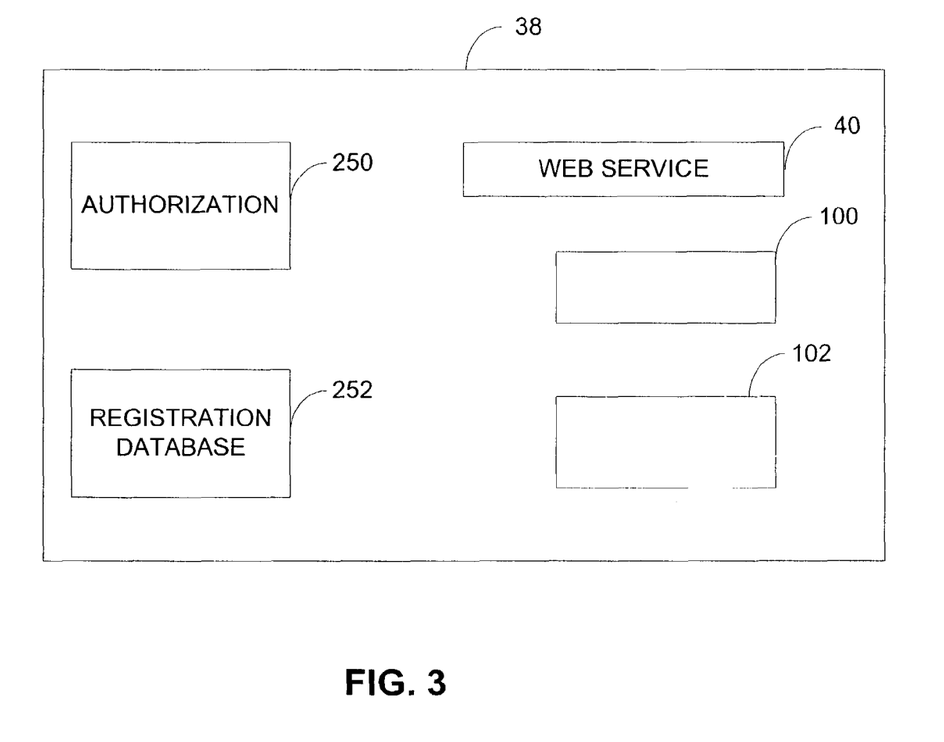
FIG. 3 is a block diagram of an example of a system that enables the system shown in FIG. 2 to automatically discover one or more of the data sources within the enterprise of FIG. 1.

FIG. 3 is a block diagram of an example of the data registration service 38 shown in FIG. 1. As described in greater detail below, the data registration service 38 enables the system 200 shown in FIG. 2 to automatically retrieve or discover the data sources 12-18 associated with the enterprise 10 shown in FIG. 1. In general, each of the data sources associated with an enterprise can register their location or address information (e.g., their URL) with the data registration service 38 and a data collection and aggregation system associated with an enterprise (such as that described in connection with FIG. 2) can automatically retrieve the location or network address information for all of the registered data sources associated with that enterprise via an open network. In this manner, the data registration service 38, enables a data collection and aggregation system to collect data from registered data sources associated with an enterprise without requiring a user to, for example, manually enter the data location or address information into a database.

In particular, as shown in FIG. 3, the data registration service 38 may include an authorization unit 250 and a registration database 252. The registration database 252 contains data source location or address information (e.g., URLs or any other network address information) for one or more of the data sources 12-18 shown in FIG. 1. Preferably, but not necessarily, all of the data sources 12-18 associated with the enterprise 10 convey their location information to the data registration service 38 for storage within the registration database 252.

The authorization unit 250 performs authorization functions that determine if requests for data source information are from authorized users and/or entities. For example, the authorization unit 250 may compare a user identifier and/or a password received from the system 200 (FIG. 2) in connection with a request for a list of data sources and their location or address information to user identifiers and/or passwords that are currently authorized for the enterprise 10. If the request is authorized, the authorization unit 250 enables the data registration service 38 to send a list, log or any other type of data structure, containing location information (e.g., network address information) for all of the data sources registered within the data registration service 38 in connection with the enterprise 10 to the system 200 shown in FIG. 2. The system 200 may then store the data source location information within its process control information database 214 for use by the data collection unit 204 in periodically collecting process control data and/or other information from one or more of the data sources 12-18 within the enterprise 10, as described above.

If desired, data source location information for more than one enterprise may be stored within the database 252 of the data registration service 38. In this manner, a plurality of enterprises may enable their respective data sources to securely and independently communicate via an open network such as, for example, the Internet, with a respective data collection and aggregation system such as that described in connection with FIGS. 1 and 2 above.

Figure 4:
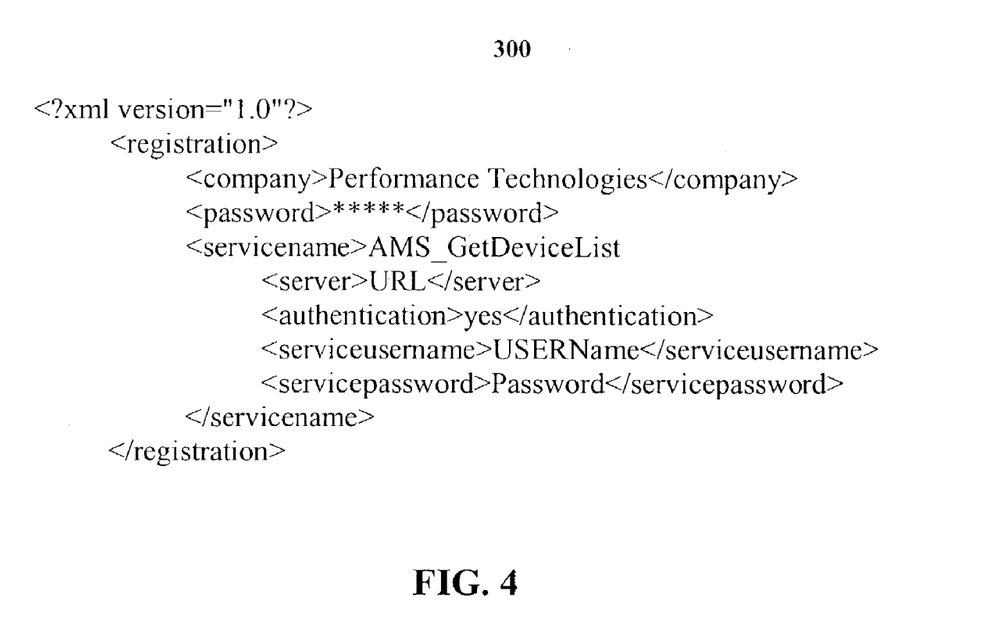
FIG. 4 depicts an example of an extensible markup language file that may be used by one or more of the data sources shown in FIG. 1 to register within the system shown in FIG. 3.

FIG. 4 depicts an example of an extensible markup language file 300 that may be used by one or more of the data sources 12-18 shown in FIG. 1 to register within the data registration service 38 shown in FIGS. 2 and 3. As shown in FIG. 4, the file 300 may include an enterprise name with which the registering entity is associated (e.g., a company name), a password associated with the enterprise, a name for the registering entity (i.e., a data source name), and location information (e.g., a URL) for addressing or communicating with the registering entity. The file 300 may also include information indicating whether or not authentication is to be used or activated and, in the event authentication information is to be used, may include a user name and password for the registering data source. Of course, other file formats including having less, more or different registration information may be used instead.

Figure 5:
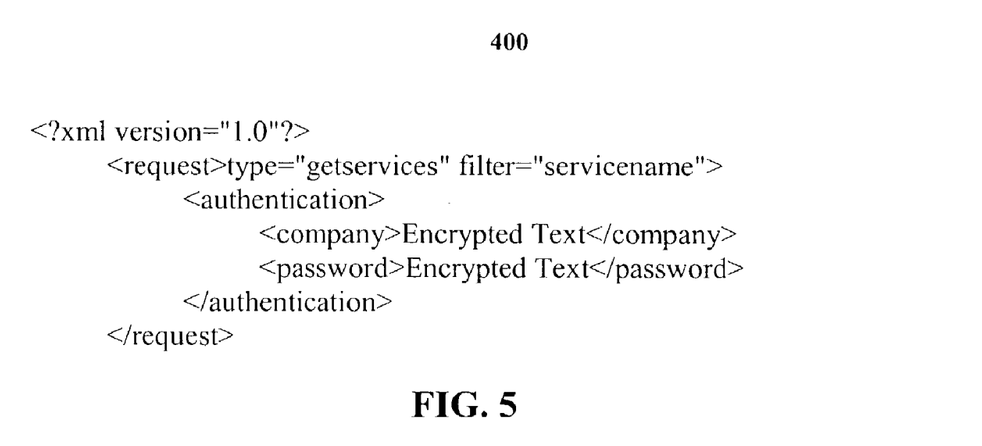
FIG. 5 depicts an example of an extensible markup language file that may be used by one or more of the data sources shown in FIG. 1 to automatically discover all registered data sources associated with the enterprise shown in FIG. 1.

FIG. 5 depicts an example of an extensible markup language file 400 that may be used by one or more of the data sources 12-18 shown in FIG. 1 to automatically discover other registered ones of the data sources 12-18 associated with the enterprise 10 shown in FIG. 1. As shown in FIG. 5, the file 400 may include a request to "getservices" that are registered under a particular "servicename," which is associated with a particular entity or enterprise. In addition, authentication information such as, for example, an enterprise name (e.g., a company name) and password, may be included in the event that the enterprise has been configured to require such authentication information prior to enabling conveyance of information from the various data sources making up the enterprise to a data collection and aggregation system such as that described herein.

While the data collection and aggregation system and method described herein has been described as being implemented using XML, it can be implemented using any other suitable transactional data language on any suitable hardware platform. Further, although the functions of the data collection and aggregation system described herein are described as being implemented primarily as software, some or all of these functions may be implemented in hardware, firmware, etc. Thus, the system and method described herein may be implemented in a standard multi-purpose processor or using specifically designed hardware or firmware as desired. When implemented in software, the software routines may be stored in any computer readable memory such as on a magnetic disk, a laser disk, or other storage medium, in a RAM or ROM of a computer or processor, etc. Likewise, the software may be delivered to a user or a process control system via any known or desired delivery method including, for example, on a computer readable disk or other transportable computer storage mechanism or over a communication channel such as a telephone line, the Internet, etc. (which are viewed as being the same as or interchangeable with providing such software via a transportable storage medium).

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A method of receiving data from a plurality of process control system data sources communicatively coupled to an open network, the data comprising one of process control data and asset data, the method comprising:
   storing location information identifying the plurality of process control system data sources,
      wherein each of the process control system plurality of data sources includes a memory storing a software routine to communicate messages containing the data via the open network;
   collecting, by the process control system, one of process control data or asset data based on the stored location information,
      wherein collecting the one of process control data and asset data comprises:
         polling the plurality of process control system data sources using the stored location information, and
         receiving the messages containing the process control data and asset data via the open network;
   determining one of process control data needed to make a process optimization decision or asset data needed to make an asset optimization decision for the process control system based on a system configuration stored in the process control system,
      wherein the system configuration comprises configuration information detailing particular types of process control or asset information needed from the received plurality of messages;
   stripping, from the received messages, the data determined to be needed based on the system configuration,
      wherein one or more of the received messages include one or more of process control data and asset data that is determined to be not needed based on the system configuration,
   discarding the process control data or asset data that is determined to be not needed;
   aggregating the stripped data to form aggregated data;
   storing the aggregated data within a process control or asset information database; and one of
      (a) optimizing a process using the aggregated data, and
      (b) optimizing an asset using the aggregated data.

2. The method of claim 1, wherein receiving the messages via the open network includes periodically sending requests for information to each of the plurality of data sources by using the location information to communicate with each of the plurality of data sources via the open network.

3. The method of claim 2, wherein periodically sending the requests for information to each of the plurality of data sources by using the location information to communicate with each of the plurality of data sources via the open network includes retrieving uniform resource locators for each of the plurality of data sources from the location information and using the uniform resource locators to send extensible markup language messages to each of the plurality of data sources via an internet.

4. The method of claim 3, wherein using the uniform resource locators to send the extensible markup language messages to each of the plurality of data sources via the internet includes sending the extensible markup language messages to a plurality of web service interfaces, each of which is uniquely associated with one of the plurality of data sources.

5. The method of claim 1, wherein aggregating the data includes generating at least one aggregation field.

6. The method of claim 5, wherein generating the at least one aggregation field includes generating the at least one aggregation field based on one of a device type, a device age, a failure type, and a time-series characteristic.

7. The method of claim 1, further including summarizing the aggregated data prior to storing the aggregated data within the database.

8. The method of claim 1, further including automatically retrieving the location information from a data source registration service communicatively coupled to the open network.

9. The method of claim 8, wherein automatically retrieving the location information from the data source registration service communicatively coupled to the open network includes sending authorization information to the data source registration service via the open network.

10. The method of claim 9, wherein sending the authorization information to the data source registration service via the open network includes sending one of an enterprise name and a password to the data source registration service.

11. The method of claim 1, further comprising displaying the aggregated data.

12. A system for use in receiving data from a plurality of data sources communicatively coupled to an open network, the data comprising one of process control data and asset data, the system comprising:
   a first database in a process control system storing location information identifying the plurality of data sources,
      wherein each of the plurality of data sources includes a memory storing a software routine to communicate messages containing the data via the open network;
   a data collection unit configured for collecting one of process control data or asset data based on the stored location information,
      wherein collecting the one of process control data and asset data comprises:
         polling the plurality of data sources using the stored location information, and
         receiving the messages containing the process control data or asset data via the open network;
   a data processing unit to identify the needed data to the data collection unit based on a system configuration stored in the process control system,
      wherein the system configuration comprises configuration information detailing particular types of process control or asset information needed from the received messages,
      wherein the data processing unit provides the system configuration to the data collection unit, and based on the received system configuration, the data collection unit strips, from the received messages, the identified needed data from the received messages, wherein one or more of the received messages include one or more of process control data and asset data that is identified to be not needed based on the system configuration, and the data collection unit discards the process control data or asset data that is identified to be not needed;

a data aggregation unit configured to aggregate the stripped data to form aggregated data;

a second database configured to store the aggregated data; and an optimization unit to optimize one of a process or an asset using the stored aggregated data, the optimized process or asset including one or more of the process control system and a plant.

13. The system of claim 12, wherein the data collection unit that is adapted to periodically send requests for information to each of the plurality of data sources by using the location information to communicate with each of the plurality of data sources via the open network.

14. The system of claim 13, wherein the data collection unit is adapted to send request messages to each of the plurality of data sources via the open network at a fixed time interval.

15. The system of claim 14, wherein the data collection unit is adapted to retrieve uniform resource locators for each of the plurality of data sources from the location information and to use the uniform resource locators to send extensible markup language messages to each of the plurality of data sources via an internet.

16. The system of claim 15, wherein data collection unit is adapted to send the extensible markup language messages to a plurality of web service interfaces, each of which is uniquely associated with one of the plurality of data sources.

17. The system of claim 13, wherein the data aggregation unit is adapted to generate at least one aggregation field.

18. The system of claim 17, wherein the data aggregation unit is adapted to generate the at least one aggregation field based on one of a device type, a device age, a failure type, and a time-series characteristic.

19. The system of claim 13, further including a data summarization unit that is adapted to summarize the aggregated data prior to storing the aggregated process control data within the second database.

20. The system of claim 13, further including a data source registration service communicatively coupled to the open network and adapted to send the location information to the first database.

21. The system of claim 13, further comprising a display unit to display the aggregated data.

22. A system for collecting data from a plurality of data sources communicatively coupled to an open network, the data comprising one of process control data and asset data, the system comprising:

a non-transitory computer readable medium; and software stored on the computer readable medium and adapted to be executed by a processor to perform a method, the method comprising:

storing location information identifying the plurality of process control system data sources, wherein each of the process control system plurality of data sources includes a memory storing a software routine to communicate messages containing the data via the open network;

collecting, by the process control system, one of process control data or asset data based on the stored location information, wherein collecting the one of process control data and asset data comprises:

polling the plurality of process control system data sources using the stored location information, and receiving the messages containing the process control data and asset data via the open network;

determining one of process control data needed to make a process optimization decision or asset data needed to make an asset optimization decision for the process control system based on a system configuration stored in the process control system, wherein the system configuration comprises configuration information detailing particular types of process control or asset information needed from the received plurality of messages;

stripping, from the received messages, the data determined to be needed based on the system configuration, wherein one or more of the received messages include one or more of process control data and asset data that is determined to be not needed based on the system configuration, discarding the process control data or asset data that is determined to be not needed;

aggregating the stripped data to form aggregated data;

storing the aggregated data within a process control or asset information database; and one of (a) optimizing a process using the aggregated data, and (b) optimizing an asset using the aggregated data.

23. The system of claim 22, wherein the software is further adapted to periodically send request for information to each of the plurality of data sources by using the location information to communicate with each of the plurality of data sources via the open network.

24. The system of claim 23, wherein the software is further adapted to be executed by the processor to retrieve uniform resource locators for each of the plurality of data sources from the location information and to use the uniform resource locators to send extensible markup language messages to each of the plurality of data sources via the Internet.

25. The system of claim 24, wherein the software is further adapted to be executed by the processor to send the extensible markup language messages to a plurality of web service interfaces, each of which is uniquely associated with one of the plurality of data sources.

26. The system of claim 23, wherein the software is further adapted to be executed by the processor to generate at least one aggregation field.

27. The system of claim 26, wherein the software is further adapted to be executed by the processor to generate the at least one aggregation field based on one of a device type, a device age, a failure type, and a time-series characteristic.

28. The system of claim 23, wherein the software is further adapted to be executed by the processor to summarize the aggregated data prior to storing the aggregated data within the database.

29. The system of claim 23, wherein the software is further adapted to be executed by the processor to automatically retrieve the location information from a data source registration service communicatively coupled to the open network.

30. The system of claim 23, wherein the software is further adapted to be executed by the processor to send authorization information to the data source registration service via the open network.

31. The system of claim 30, wherein the software is further adapted to send one of an enterprise name and a password to the data source registration service via the open network.

32. A method of retrieving data from a plurality of process control system data sources, the data comprising one of process control data and asset data, the method comprising:
storing network address information identifying the plurality of process control system data sources,
wherein each of the plurality of data sources includes a memory storing a software routine to communicate messages containing the data via the open network;
collecting, by the process control system, one of process control data or asset data based on the stored network address information,
wherein collecting the one of process control data or asset data comprises:
polling the plurality of data sources using the stored location information, and
receiving the messages containing the one of process control data or asset data via the open network;
determining one of process control data needed to make a process optimization decision or asset data needed to make an asset optimization decision for the process control system based on a system configuration stored in the process control system,
wherein the system configuration comprises configuration information detailing particular types of process control or asset information needed from the received plurality of messages;
stripping, from the received messages, the data determined to be needed based on the system configuration,
wherein one or more of the received messages include one or more of process control data and asset data that is determined to be not needed based on the system configuration;
discarding the process control data or asset data that is determined to be not needed;
aggregating the stripped data to form aggregated data;
storing the aggregated data within a process control or asset information database; and
one of
(a) optimizing a process using the aggregated data, and
(b) optimizing an asset using the aggregated data.

33. The method of claim 32, wherein retrieving the network address information from the database includes requesting the network address information from a data source registration service and receiving messages containing the network address information from the data source registration service via the open network.

34. The method of claim 32, wherein using the network address information to send the request messages to the data sources via the open network and the respective web service interfaces of the data sources includes repeatedly sending the request messages to the data sources.

35. A system for retrieving data from a plurality of data sources, the data comprising one of process control data and asset data, the system comprising:
a non-transitory computer readable memory; and
software stored on the computer readable memory and adapted to be executed by a processor to perform a method, the method comprising:
storing network address information identifying the plurality of process control system data sources,
wherein each of the plurality of data sources includes a memory storing a software routine to communicate messages containing the data via the open network;
collecting, by the process control system, one of process control data or asset data based on the stored network address information,
wherein collecting the one of process control data or asset data comprises:
polling the plurality of data sources using the stored location information, and
receiving the messages containing the one of process control data or asset data via the open network;
determining one of process control data needed to make a process optimization decision or asset data needed to make an asset optimization decision for the process control system based on a system configuration stored in the process control system,
wherein the system configuration comprises configuration information detailing particular types of process control or asset information needed from the received plurality of messages;
stripping, from the received messages, the data determined to be needed based on the system configuration,
wherein one or more of the received messages include one or more of process control data and asset data that is determined to be not needed based on the system configuration;
discarding the process control data or asset data that is determined to be not needed;
aggregating the stripped data to form aggregated data;
storing the aggregated data within a process control or asset information database; and
one of
(a) optimizing a process using the aggregated data, and
(b) optimizing an asset using the aggregated data.

36. The system of claim 35, wherein the software is further adapted to be executed by the processor to request the network address information from a data source registration service and to receive messages containing the network address information from the data source registration service via the open network.

37. The system of claim 35, wherein the software is further adapted to be executed by the processor to repeatedly send the request messages to the data sources.

* * * * *

UNITED STATES PATENT AND TRADEMARK OFFICE
CERTIFICATE OF CORRECTION

PATENT NO. : 7,953,842 B2  
APPLICATION NO. : 10/368816  
DATED : May 31, 2011  
INVENTOR(S) : Steven R. Dillon et al.

Page 1 of 1

It is certified that error appears in the above-identified patent and that said Letters Patent is hereby corrected as shown below:

In the Claims:

At Column 18, line 34, "request" should be -- requests --.

Signed and Sealed this  
Thirty-first Day of July, 2012

David J. Kappos  
*Director of the United States Patent and Trademark Office*